(12) United States Patent
Studer

(10) Patent No.: US 7,068,359 B2
(45) Date of Patent: Jun. 27, 2006

(54) CONTACTLESS SYSTEM FOR MEASURING CENTRICITY AND DIAMETER

(75) Inventor: Urs-Peter Studer, Riehen (CH)

(73) Assignee: Zumbach Electronic AG, Orpund (CH)

( * ) Notice: Subject to any disclaimer, the term of this patent is extended or adjusted under 35 U.S.C. 154(b) by 0 days.

(21) Appl. No.: 10/509,965

(22) PCT Filed: Mar. 1, 2003

(86) PCT No.: PCT/EP03/02117

§ 371 (c)(1),
(2), (4) Date: Oct. 4, 2004

(87) PCT Pub. No.: WO03/085354

PCT Pub. Date: Oct. 16, 2003

(65) Prior Publication Data

US 2005/0168724 A1    Aug. 4, 2005

(30) Foreign Application Priority Data

Apr. 8, 2002 (DE) ................................ 102 15 432
May 3, 2002 (DE) ................................ 102 19 848

(51) Int. Cl.
*G01N 21/00* (2006.01)

(52) U.S. Cl. .................................................. 356/73.1

(58) Field of Classification Search ..................... None
See application file for complete search history.

(56) References Cited

U.S. PATENT DOCUMENTS

| 4,086,044 A | * | 4/1978 | Sikora .................... 425/113 |
| 4,124,728 A | * | 11/1978 | Marcuse et al. .............. 427/8 |
| 5,214,376 A | | 5/1993 | Sikora |
| 5,862,250 A | * | 1/1999 | Csipkes et al. ............. 382/141 |
| 6,661,502 B1 | * | 12/2003 | Jakobsen et al. .......... 356/73.1 |

FOREIGN PATENT DOCUMENTS

| CH | 667 327 A | 9/1988 |
| DE | 25 17 709 A | 11/1976 |
| EP | 0 692 697 A | 1/1996 |

* cited by examiner

*Primary Examiner*—Tu T. Nguyen
(74) *Attorney, Agent, or Firm*—Venable LLP; Robert Kinberg

(57) ABSTRACT

A contactless system for measuring centricity and diameter includes an optical measuring device for determining the external diameter and the position of a cable on an optical, perpendicular plane that runs transversally to the central axis Z of a measuring device. The cable has a conductor and a jacket that insulates the conductor and is pulled through the measuring device along the central axis Z. The system also includes an inductive measuring coil device for determining the position of the conductor on an inductive measuring plane, which is likewise perpendicular and runs transversally to the central axis Z of the measuring device. A correlation device correlate the position of the cable, determined by the optical measuring device with the position of the conductor calculated by the inductive measuring coil device and calculates the centricity of the conductor in the jacket from the correlation.

13 Claims, 8 Drawing Sheets

CONTACTLESS SYSTEM FOR MEASURING CENTRICITY AND DIAMETER

CROSS-REFERENCE TO RELATED APPLICATIONS

The present application is a U.S. National Stage of International Application No. PCT/EP03/02117, filed Mar. 1, 2003, designating the United States and claiming priority of German Application No. 102 15 432.5 filed Apr. 8, 2002 and German Application No. 102 19 848.9 filed May 3, 2002.

BACKGROUND ON THE INVENTION

The invention relates to a contactless system for measuring centricity and diameter, said system comprising i) an optical measuring device for determining the external diameter and position of a harness in an optical measuring plane, arranged perpendicular and transverse to the central axis Z of a measuring device, wherein the harness comprises a conductor and a jacket for insulating said conductor and is pulled in the direction of the central axis Z through the measuring device; ii) an inductive measuring coil arrangement for determining the position of the conductor in an inductive measuring plane, which is also arranged perpendicular and transverse to the central axis Z of the measuring device; and iii) means which correlate the position of the harness determined with the optical measuring device and the position of the conductor determined with the inductive measuring coil arrangement and which calculate from this correlation the centricity of the conductor inside the jacket. The invention also relates to a corresponding method.

The harness in particular is a cable. When producing such harnesses and in particular cables, the jacket or coating is normally affixed to the conductor by means of extrusion, wherein the jacket can consist of one layer or can be composed of several layers that concentrically surround the conductor.

In the following, the invention is explained for reasons of simplicity with the aid of cables and the production of cables, wherein the term "cable" is representative for all types of harnesses having an electrically conductive core or carrier. It is critical that cables on the one hand have the required diameter, so that they exhibit the required electrical characteristics and, in particular, are sufficiently insulating. On the other hand, it is important that the conductor extends through the center of the cable jacket or the coating, which is particularly important for data cables and antenna cables.

Numerous devices for determining either the external diameter of a cable or the centricity of the conductor inside a cable are known. For example, reference DE 25 17 709 describes a device for measuring and controlling the wall thickness of insulated harnesses, wherein this device measures the eccentricity with the aid of an induction measurement. For this, inductive sensors are arranged at a peripheral distance around the cable and respond to the magnetic field generated by a current induced in the conductor. This known device furthermore has two optical arrangements that are offset relative to each other by 90° so that their measurement axes are perpendicular to each other. The position of the cable jacket can be determined with the aid of these optical arrangements.

This known device is provided with a measuring head which can be displaced, for example in horizontal and vertical direction, and for which the position can be adjusted such that the conductor is centered relative to the measurement head.

A method and a device for testing the wall thickness of an insulating layer are furthermore known from Swiss reference CH 667 327 A5. This device comprises on the one hand a measuring device for determining the external diameter and, on the other hand, a measuring device for determining the wall thickness of the insulating material. The determined measuring values are supplied to a computer which then computes the eccentricity of the conductor and the wall thickness. The measuring device for measuring the wall thickness of the cable insulation is an inductive measuring device which operates based on the eddy current principle and determines the distance between the sensor and the conductor surface. A measuring principle of this type is called "passive" within the framework of the present documents, meaning no current is supplied to the cable conductor. The measuring coils in that case are active coils that are arranged symmetrical to the central axis of the device and form a component of a resonating circuit. They measure the eddy current generated by the conductor, from which the distance to the conductor surface is determined.

With this known device, the two aforementioned measuring devices are positioned at a distance to each other in axial direction and thus in the direction of the conductor. As a result, the optical measuring plane and the inductive measuring plane also are at a distance to each other.

Within the framework of the present documents, a measurement or a measuring system is considered active if a current is induced in the conductor, for example a high-frequency alternating current with the aid of an inductor. The magnetic field lines of the field generated in this way extend concentrically around the conductor or the conductor axis and are detected with passive coils.

A different device for determining the position of a conductor relative to the external surface of an extruded coating is known from EP-A-0 612 975. In this reference it is emphasized that it is important for the electrical and mechanical characteristics of an extruded cable to position the conductor along the central cable axis. To determine the eccentricity, this known device uses a combination system, comprising an optical device for determining the cable position in one measuring plane and an inductively operating device for determining a conductor position inside the insulation material or the jacket.

The optical device is provided with two light sources, arranged at an angle of 90° to each other, which emit light perpendicular to the longitudinal cable axis of onto the cable and thus in the direction of the X-axis as well as in the direction of the Y-axis. Respectively one light-measuring device is arranged opposite the light sources, thus making it possible to determine the position of the cable in the measuring plane as well as the external diameter of the cable to be measured.

Also provided are two pairs of induction coils which are arranged on both sides of the cable, wherein one coil pair is arranged in the direction of the X-axis and the other pair in the direction of the Y-axis. If the conductor of the cable to be measured is admitted with an alternating current, a magnetic field is generated which is measured by the induction coils. If the currents measured in the induction coils are equally strong, the conductor is located in the center between the coil pairs and thus is in a central position.

Since the position of the outer cable jacket surface is known from the optical measurement and the position of the conductor is known from the inductive measurement, the centricity of the conductor can be calculated.

With this known device, the measuring planes for the optical measurement and the inductive measurement are arranged axially one behind the other. Thus, if the optical measurement and the inductive measurement occur simultaneously at an optional point in time, the values determined in the process refer to different and axially spaced apart measuring planes and thus different locations or positions of the extruded cable. In addition, grave measurement errors occur if the conductor axis is tilted relative to the central axis of the device or encloses an angle with this central axis.

Additional devices of the type discussed herein are described in references CH-A 542 426, CH-A 683 370 and CH-A 463 124. A new method for measuring the diameter of a harness is explained in reference DE-A 197 57 067.

It is the object of the present invention to provide a measuring system which makes it possible to easily and simultaneously measure the external diameter of a harness, in particular a cable, and the eccentricity of a conductor for this harness/cable, for the same harness location.

This object is solved with the disclosed device.

With the measuring system according to the invention, the harness or the cable to be measured, in particular produced through extrusion, is essentially pulled in the direction of the central axis through the measuring device according to the invention. The system in particular represents a type of measurement yoke, which will be discussed later on.

The cable conductor is provided with an insulating jacket. If the conductor is centered inside this jacket and if the cable to be measured extends or is pulled in the direction of the central axis, as well as is guided and thus pulled centrally through the measuring device or the measurement yoke, then the conductor axis coincides with the central axis of the measuring device according to the invention. With the measuring device according to the invention, however, it is possible to determine reliable and exact values even if the conductor axis, for example, is displaced relative to the central axis—regardless of whether it is centered in the cable or not—or if the conductor axis is tilted relative to the central axis. Further explanations for this can be found below.

An optical measuring device is used to determine the external diameter that is determined in an optical measuring plane. The measuring plane for this optical measuring device is here arranged perpendicular and transverse to the central axis of the measuring device. In other words, the central axis of the measuring device and also the conductor axis form the normal to this optical measuring plane.

Furthermore, the position of the coating (more precisely the outer jacket surface) and thus the position of the cable in the optical measuring plane is determined with the optical measuring device. In other words, it is possible to determine whether the central longitudinal axis of the cable coincides with the central axis of the optical measuring device and thus runs through the central measuring point S or is displaced relative to this point. The longitudinal axis of the cable in this case must be distinguished from the conductor axis of the cable since the latter can be positioned eccentrically inside the jacket and in that case does not coincide with the central axis of the measuring device, even if the longitudinal axis of the cable and the central axis of the measuring device coincide.

The optical measuring device can be a known optional device. Various measuring devices of this type are known and described in the above-listed references. The type of optical measuring device used is therefore not critical. For example, the optical measurement can be realized with a laser scanner or a CCD camera or on a photometric basis.

The optical measuring device advantageously is designed such that the position and diameter of the cable are determined in X-direction and Y-direction, wherein these two directions in particular are perpendicular to each other, are positioned one on top of the other, and enclose a 90° angle.

In the latter case, the optical measuring device usefully consists of two optical measuring systems, which are synchronized through a joint triggering of the measurement (shutter, flash, readout of CCD or the like). Furthermore, the two optical measuring systems are synchronized through a synchronous control of optical scanners and the use of a joint scanner (polygonal mirror) and a ray path that is correspondingly developed with the aid of a mirror. For an optical measurement by means of laser beams, respectively one laser with optical scanner can be used for each measurement axis, respectively for the X-direction and the Y-direction.

It is also possible to realize the optical measurement with more than two measuring systems, for example three measuring systems. In the latter case, the measurement axes and the measurement directions preferably form an angle of 60°, wherein all of these measurement directions and measurement axes are located in a single measuring plane.

However, the device according to the invention preferably has an optical measuring device with two light sources, which are in particular arranged offset at a 90° angle relative to each other and emit light in the optical measuring plane. This light impinges on the harness and is detected on the opposite side of the harness by respectively one sensor that is assigned to the light source.

The device according to the invention is furthermore provided with an inductive measuring coil arrangement for determining the position of the cable conductor in the inductive measuring plane. The measuring plane for this inductive measuring coil arrangement, here also referred to as inductive measuring plane, also extends perpendicular and transverse to the central axis of the measuring device and thus also to the conductor axis.

The device according to the invention is distinguished in that the measuring coils of the measuring coil arrangement are arranged in pairs or are cut in half with respect to the optical measuring plane. As a result, different field intensities are determined on the one hand in front of the optical measuring plane and on the other hand behind the optical measuring plane. The determined field intensities are then correlated, in such a way that the field intensity in the so-called inductive measuring plane is obtained, which coincides with the optical measuring plane by forms a joint, active measuring plane M that simultaneously forms the optical measuring plane.

The expression "in pairs" is intended to indicate the existence of a pair of measuring coils and thus two measuring coils. One of these measuring coils is located in front of the active measuring plane and the other one is located symmetrically thereto on the other side and thus behind the active measuring plane M.

The expression "cut in half" refers to a measuring coil where half of the effective surface of this measuring coil is located on one side of the measuring plane M and determines the field intensity there while the other half is located on the other side of the measuring plane M and determines the field intensity there. The actual inductive measuring plane in that case corresponds to the active measuring plane. The measuring plane so-to-speak cuts in half the effective surface of the measuring coil, thus correlating the two field intensities, measured in front of and behind the measuring plane with the measuring coil embodied in this way, to each other in such a way that a joint measuring plane results, respectively the inductive measuring plane coincides with the optical measuring plane, thus forming the active measuring plane.

With the arrangement in pairs of the measuring coils, the field intensities measured by the individual measuring coils of a pair are correlated in a computation. In other words, the computation determines the field intensity in a type of visual measuring plane. It is not the concrete field intensity that is determined in this virtual plane, which corresponds to the optical measuring plane and represents the joint active measuring plane M. Rather, the field intensity is determined through computation in this virtual measuring plane.

According to a preferred embodiment, all measuring coils in the measuring coil arrangement have the same effective surface and preferably the same form and surface area. The effective surface in this case is understood to mean the surface through which the field lines penetrate in perpendicular direction. If the surface spanned by the coil of a measuring coil is arranged perpendicular to the field lines, then the spanned surface area corresponds to the effective surface. However, if the arrangement is not perpendicular and the field lines penetrate the spanned surface at an angle of less than 90°, then the effective surface is smaller than the spanned surface area. For example, if two measuring coils have the same effective surface, then the voltage induced in those two measuring coils is the same if the field intensity is the same. In the case of a measuring coil pair, one measuring coil of the two measuring coils is used for a measurement in front and the other one for a measurement behind the measuring plane M.

The measuring system according to the invention is furthermore provided with means that correlate the data, determined with the optical measuring device for the cable position, with the data determined with the inductive measuring coil arrangement for the position of the conductor. These means include, for example, a computer unit that is known per se.

The position of the cable in the active measuring plane M and thus also the position of the outer jacket surface for the cable cover is calculated from the data obtained with the aid of the optical measurement, wherein the cable diameter is also determined in the process. In other words, the position of the cross-sectional surface of the cable in the measuring plane is determined optically. As a result of the data obtained during the inductive measurement, the position of the conductor inside the cable is determined in the active measuring plane M. Since the position of the cross-sectional surface in the measuring plane is known, it is possible to use the inductive measurement data in a calculation to determine where the conductor is located in the cross-sectional area. If the conductor for a round cable, for example, is located in the center of the circular cross-sectional area, then the conductor is arranged centrally. If the conductor is not located in the center, then the conductor axis is displaced relative to the centered longitudinal axis of the cable, meaning it is eccentric.

The above statement is also true if the cable and thus its longitudinal axis is displaced to the side or tilted relative to the central axis of the measuring device. This optical measuring device is used to determine the position and the expansion of the cross-sectional area in the measuring plane, which also shows whether or not the longitudinal axis runs through the central measuring point S in the measuring plane, wherein the latter is preferred since the measuring accuracy is highest in that case and the measurement has linearity. For that reason, the optical measuring device and the inductive measuring coil arrangement are designed to be displaceable. If possible, this displacement, the measuring should be realized such that the cable to be measured extends through the central measuring point during the measuring operation.

The measuring system according to the invention furthermore includes all electronic components required for the measurement and processing of the measured data, e.g. amplifiers, converters, etc., wherein such components are known and do not require further explanations.

The optical measurement and the inductive measurement are advantageously carried out at the same time. In other words, both measurements relate to the same location or position of the cable to be measured.

The optical measurement and the inductive measurement preferably take place in real time and the resulting data are also processed in real time.

The inductive measurement realized with the inductive measuring coil arrangement can be either passive or active. However, the inductive measurement preferably takes the form of an active measurement, for which the device according to the invention is provided with a device for inducing a high-frequency alternating current in the conductor of the cable to be measured.

For the inductive measurement, the field lines for the field induced by the current in the conductor run concentrically around this conductor. To determine the intensity of this field, measuring coils can be used for which the winding and the effective surface may be located in a plane that extends perpendicular to the field lines and through which the lines extend at a right angle. It makes sense if two coils are used for the measurement in a plane, which are arranged symmetrical to the central axis Z of the measuring device.

In principle, it is sufficient to carry out the inductive measurement in one plane, wherein the same is true for the optical measurement.

For an inductive measurement in one plane, it is necessary to measure the field intensity on two sides of the central axis Z, meaning in front and behind the measuring plane M. This can be achieved by using two separate measuring coils for each plane for the measuring on one side of the plane M, wherein these coils are arranged symmetrical to the central axis Z. Two different separate measuring coils of this type are present on the other side of the measuring plane M.

This can furthermore be achieved by using measuring coils which are here referred to as differential coils. Differential coils are coils for which the effective surface, which can also be called the effective measurement surface, is divided into two halves with respect to the central axis Z. These two surfaces are preferably located in one plane, so that the one surface measures the field intensity on one side of the central axis Z, while the other surface measures the field intensity on the other, opposite side of central axis Z. The total measurement field is thus cut in half by the central axis Z.

A measurement with three separate measuring coils is possible as well, wherein these measuring coils are preferably arranged in a star-shaped pattern and at angles of 120°. The field intensities measured by the coils are then correlated in such a way that the position of the conductor in the inductive measuring plane results.

The inductive measurement is preferably realized in two planes, here referred to as X-plane and Y-plane, wherein the X-plane and Y-plane enclose an angle that is preferably 90° in this case. The X-plane and the Y-plane are furthermore perpendicular to the measuring plane M or they intersect with this plane at a right angle, thus spanning so-to-speak a three-dimensional space. The central axis Z for the measuring device forms the intersecting line for the X-plane and the Y-plane and extends through the central measuring point S in the active measuring plane M.

Of course, the number of planes in which an inductive measurement is carried out can also be increased, e.g. to three planes that advantageously enclose an angle of 60°. Even if the measuring accuracy is increased by this, an inductive measurement (and also an optical measurement) in two planes and/or directions is normally sufficient.

In principle, an optional number of separate measuring coils can be used for the inductive measurement.

The separate measuring coils for the inductive measurement are preferably distributed evenly in peripheral direction around the central axis Z.

To carry out the optical measurement as well as the inductive measurement in a joint plane, namely the active measuring plane M, separate measuring coils are positioned in a first embodiment in such a way that they are so-to-speak divided in half by the measuring plane of the optical measuring device. This optical measuring plane also represents the inductive measuring plane, so that it forms the joint active measuring plane M.

Since it is difficult for spatial reasons to position the measuring coils in this measuring plane M and simultaneously if possible carry out the optical measurement in two directions that are perpendicular to each other in the measuring plane M, it is advantageous if the X-direction and the Y-direction of the optical measuring device are not located in the X-plane and the Y-plane in which the measuring coils are located. Rather, this X-direction and the Y-direction are offset by an angle, in particular a 45° angle, with respect to the X-plane and the Y-plane.

According to a different embodiment, the measuring coil arrangement for the device according to the invention comprises four measuring coil pairs. Four separate measuring coils of these measuring coil pairs are arranged in the X-plane while four additional, separate measuring coils are arranged in the Y-plane. For this, one measuring coil of a measuring coil pair is positioned in front of the measuring plane M and the other measuring coil of the measuring coil pair is positioned behind the measuring plane M. The measuring coils are arranged symmetrical to the active measuring plane M and preferably also to the measurement axis Z, so that a point symmetry results with respect to the central measuring point S.

The field intensity (or voltage) determined with one measuring coil and the field intensity (or voltage) determined with the second measuring coil of this measuring coil pair are thus added up. The same holds true for the measuring coil pair on the other side of the central axis Z. The resulting difference shows the field intensity computed for the measuring plane M. The effective surfaces of all four measuring coils in this case should be the same.

In another preferred embodiment of the invention, differential coils are used, for which the effective surface is located in the X-plane or the Y-plane. The inductive measurement in that case can be realized in more than two planes, e.g. three or four planes, wherein this requires a corresponding increase in the number of differential coils.

According to one preferred embodiment, the differential coils have a winding that is divided into sections extending on both sides of the central axis Z, as well as parallel thereto, meaning either in the X-plane or the Y-plane. These parallel sections are connected through connecting bends that extend concentric to the central axis Z. Since these connecting bends extend in the direction of the field lines, they are effect-neutral. Thus, the effective surface covers only the surface spanning the area between the two parallel sections of the coil.

The sections extending between two connecting bends must not necessarily extend parallel to the central axis Z. Rather, it is conceivable that these sections extend in a curved shape in the X-plane or the Y-plane, wherein of course the two effective surfaces on both sides of the central axis Z must be identical in size.

The device according to the invention furthermore preferably comprises means for displacing and adjusting either the optical measuring device or the inductive measuring coil arrangement. These means include, for example, a positioning system with positioning drives and a respective control. Also provided are means for measuring the voltage, determining the phase etc. and for processing the obtained data, such as a computer unit. However, these means are all known means and need not be explained further.

The subject matter furthermore includes a method.

BRIEF DESCRIPTION OF THE DRAWINGS

The invention is explained in further detail in the following with the aid of the enclosed drawings, which show preferred embodiments that illustrate the invention diagrammatically and not true to scale, wherein the drawings show in.

DETAILED DESCRIPTION OF THE INVENTION

Figure 1:
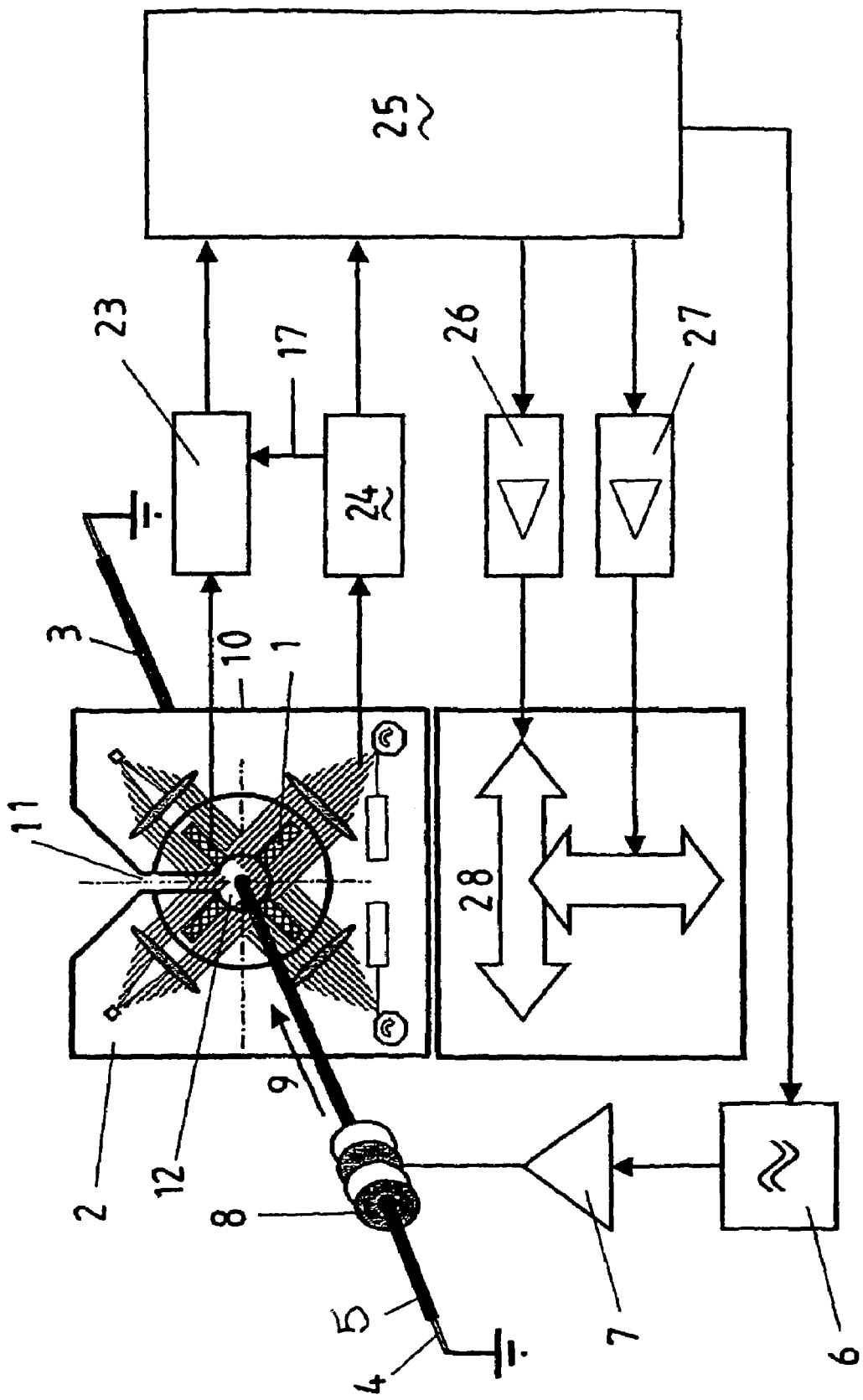
FIG. 1 A system overview of the device according to the invention.
Figure 3:
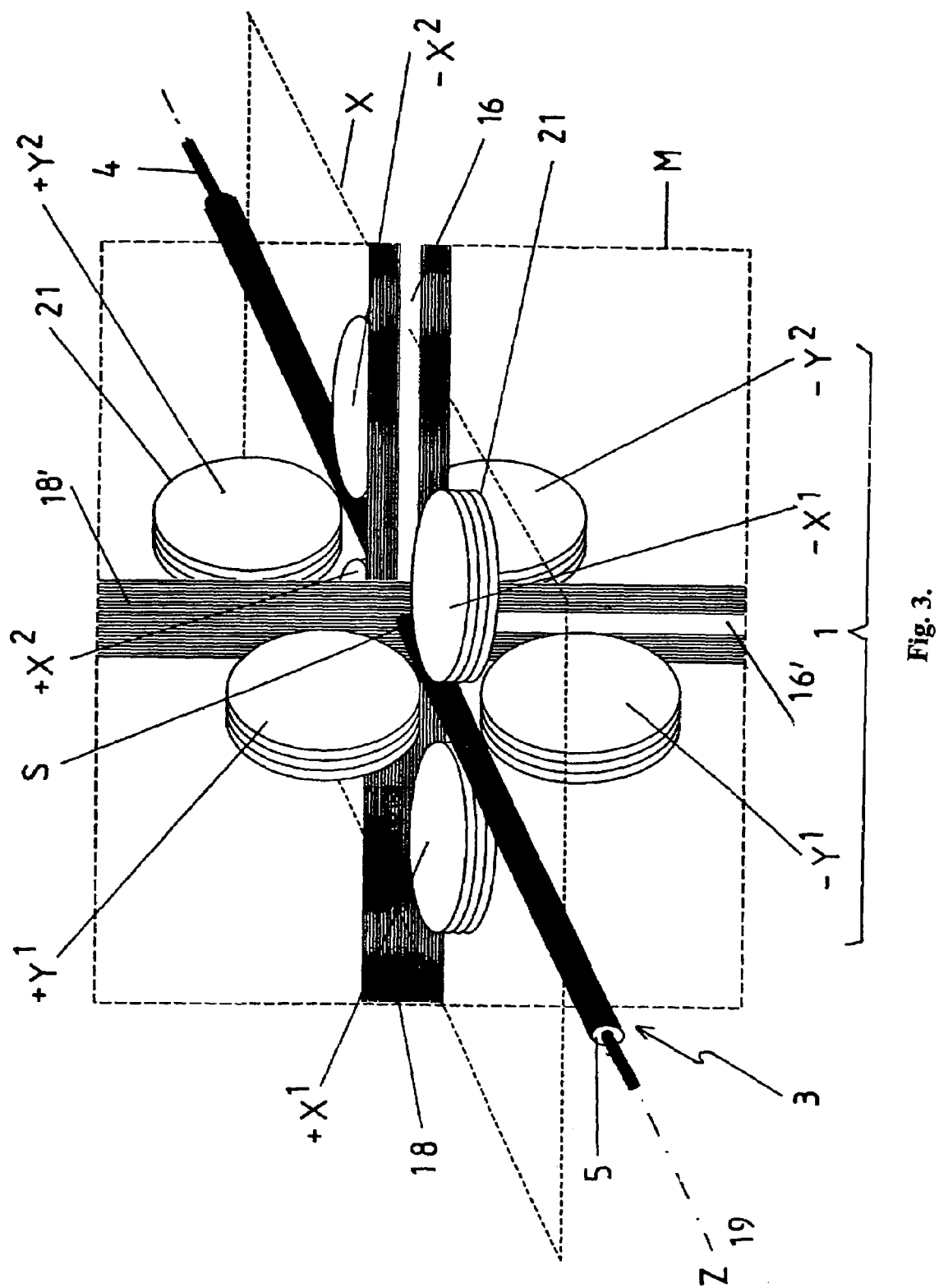
FIG. 3 The positioning of the measuring coils of the measuring coil arrangement and the various planes in a diagrammatic and perspective representation for the first embodiment according to FIG. 2.

With the device according to the invention, e.g. as shown in FIG. 1, a cable 3 is guided through a measuring device 2 in the form of a measurement yoke. As can be seen in FIG. 3, this cable 3 has a centered conductor 4 that is surrounded by a jacket 5 of an insulating material. A cable 3 of this type is normally produced by extruding it. The device according to the invention or the measurement yoke 2 can be integrated into the currently running production line for this cable 3 and can be positioned downstream of the extrusion nozzle, either in front of the normally used cooling bath or even behind it. A current 9 is induced in this cable 3 with the aid of an oscillator 6, e.g. a 160 kHz oscillator, and an amplifier 7 (e.g. 60 watt), as well as an inductor 8.

Figure 2:
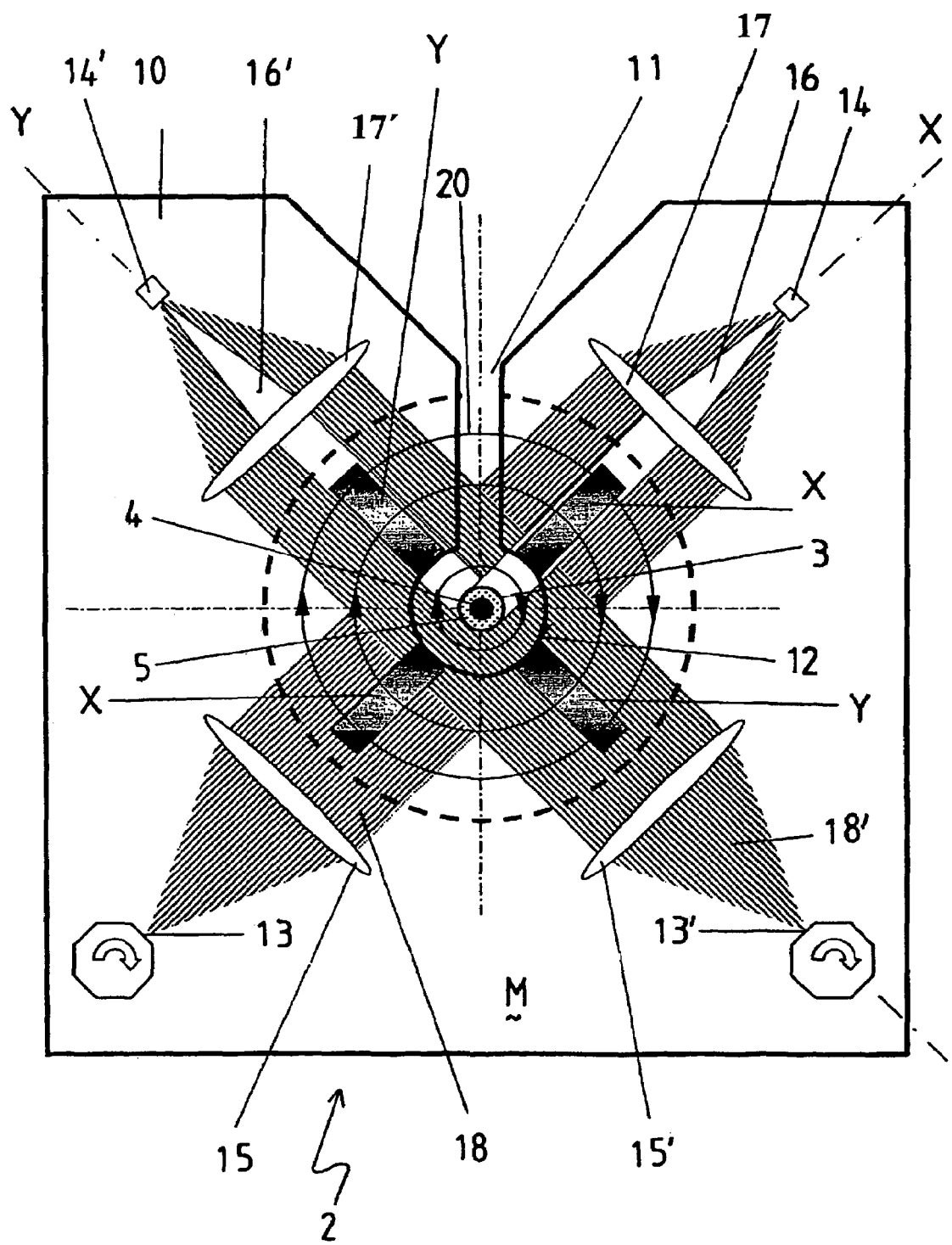
FIG. 2 The structural principle for a measuring device in the form of a measurement yoke according to a first embodiment of the invention.

The measurement yoke 2, shown in further detail in FIG. 2, comprises a housing 10 and has an approximately disk-shaped or plate-shaped design. The center of this housing contains a central opening 12 through which the cable 3 can be pulled, wherein the cable is inserted through a slot 11 into this opening 12. The central axis Z extends perpendicular to the housing 10 and thus also perpendicular to the paper plane in FIG. 2, wherein the housing 10 is located approximately in the paper plane. The central opening 12 has an essentially circular design.

The housing 10 extends by several centimeters in the direction of the central axis Z. The housing 10 contains the optical measuring device and the inductive measuring coil arrangement.

With the embodiment shown in FIG. 2, two optical measuring devices 13, 14; 13', 14' are provided in the housing 10, which are respectively provided with a light source 13, 13' and a receiver 14, 14'.

The light sources 13, 13' for the above-mentioned embodiment represent a laser scanner with polygonal mirror. The fan-shaped laser beams 18, 18' that is emitted by the mirror are aligned parallel with the aid of a lens 15, 15'. The parallel laser beams 18, 18' subsequently impinge on the cable 3 to be measured, which the laser beams 18, 18' naturally do not penetrate, so that a shadow 16, 16' is created behind the cable 3. During the further course, the laser beams 18, 18' are then focused with a second lens 17, 17' onto the receivers 14, 14', which permits determining the width of shadow 16, 16' and thus the position of cable 3 in the measuring plane M as well as its diameter.

All the various known devices can be used for such an optical measurement, wherein the measuring device explained herein is only one of many options.

With the embodiment shown in FIG. 2, the optical measuring device 13, 14 measures the position of the jacket 5 for cable 3 in the X-direction while the other optical measuring device 13', 14' determines the position in the Y-direction. The external diameter is also obtained in the process. The X-direction and the Y-direction in this case form a 90° angle or are positioned perpendicular to each other. The paper plane in FIG. 2 represents the measuring plane M in which the laser beams 18, 18' extend. It is also possible to view the measurement yoke 2 in such a way that the paper plane in FIG. 2 divides the housing 10 approximately into two halves, one of which is located above the paper plane and one below the paper plane.

Also indicated in FIG. 2 are measuring coil pairs X, Y, for which the position and embodiment are illustrated in FIG. 3. Each measuring coil pair +X, −X; +Y, −Y consists of two separate measuring coils $+X^1$, $+X^2$; $-X^1$, $-X^2$; $+Y^1$, $+Y^2$; $-Y^1$, $-Y^2$ that are positioned symmetrical, relative to the measuring plane M, in a plane (either X or Y) with central axis Z. The embodiment shown in FIG. 3 thus has two measuring coil pairs +X, −X which are located in the X-plane, wherein this X-plane is perpendicular to the measuring plane M. For this, a coil $+X^1$ of the coil pair +X is positioned in front of the measuring plane M while the other coil $+X^2$ of this measuring coil pair +X is positioned behind the measuring plane M. The measuring coil pair −X in this X-plane is thus positioned symmetrically opposite the measuring coil pair +X, relative to the central axis Z. The latter measuring coil pair −X comprises a separate measuring coil $-X^1$ in front of the measuring plane M and a separate measuring coil $-X^2$ behind the measuring plane M.

The same holds true for the measuring coil pairs +Y and −Y. A separate measuring coil $+Y^1$ or $-Y^1$ of the two measuring coil pairs +Y and −Y is positioned in front of the measuring plane M while the second, separate measuring coil $+Y^2$ or $-Y^2$ is arranged behind and symmetrical to the measuring plane M. Otherwise, the measuring coil pairs +Y and −Y are positioned in the Y-plane which is not shown in the perspective representation in FIG. 3. The measuring plane M in this case represents the plane in which the laser beams 18, 18' also extend.

The X-plane and the Y-plane are perpendicular to each other (meaning they enclose an angle of 90°) and are also positioned at a right angle to the measuring plane M. The central axis Z in this case extends along the intersecting line for the X-plane and the Y-plane. If the cable 3 with centrally positioned conductor 4 is optimally aligned, the conductor axis 19 also coincides with the central axis Z and thus with the intersecting line for the X-plane and the Y-plane. For this embodiment, the measuring coils shown in FIG. 3 are arranged point-symmetrical to the central measuring point S. In addition, they have the same form and size and thus the same effective surface or measurement surface.

Figure 4:
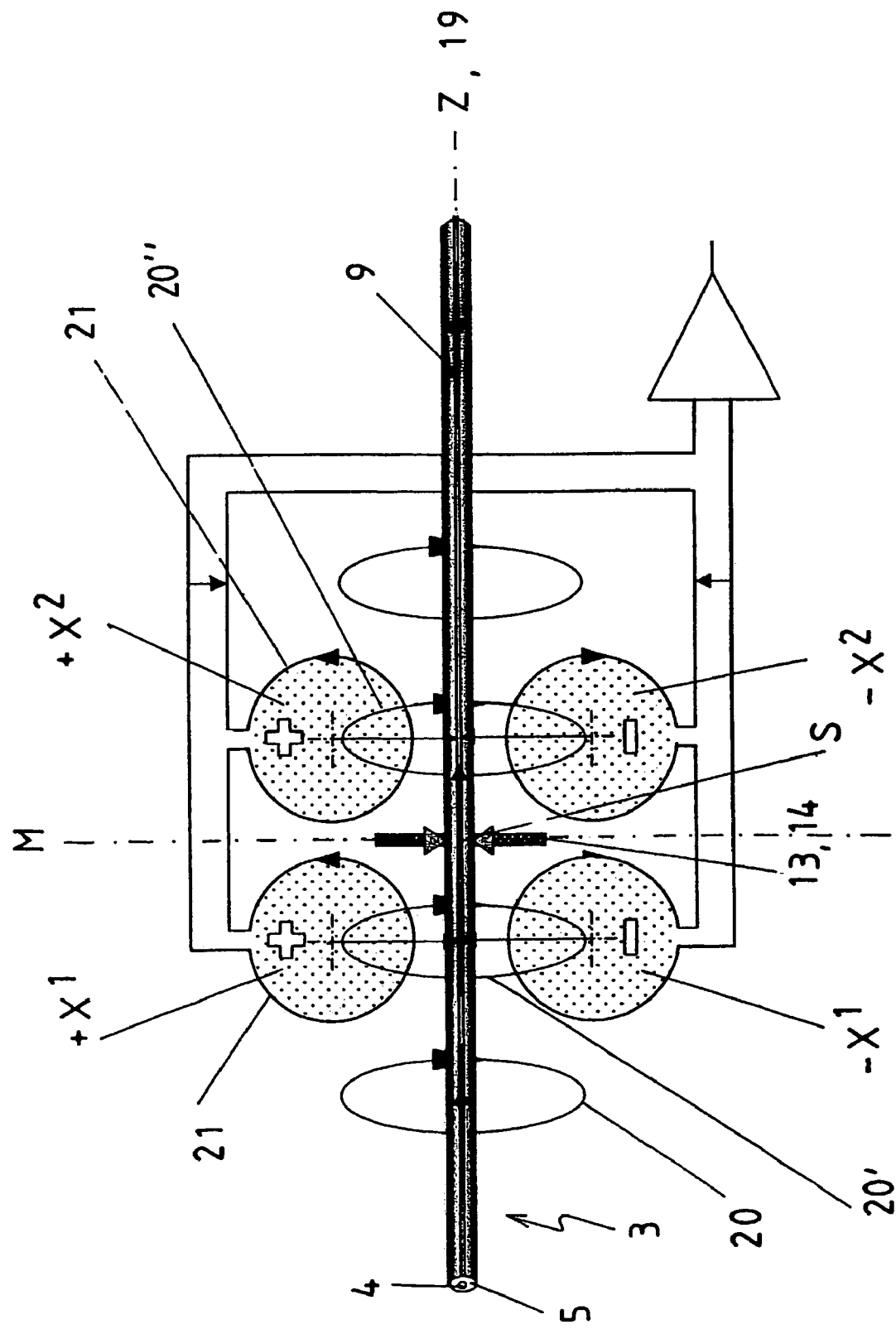
FIG. 4 A view from above of the X-plane in FIG. 3, in a simplified representation with a cable, for which the conductor axis coincides with the central axis of the device according to the invention.

For a further explanation, we point to FIG. 4 which shows a view from above of the X-plane in FIG. 3, wherein the "correlations" are shown schematically for a better understanding. As a result of the current 9, which is induced in the conductor 4 of cable 3, a field with concentric field lines 20 is generated around the cable 3. The outside diameter of cable 3 and thus of the jacket 5 is determined with the optical measuring devices 13, 14; 13', 14' in the measuring plane M, wherein all separately shown measuring coils are located in the X-plane. In other words, the windings 21 of these measuring coils $+X^1$, $+X^2$, $-X^1$, $-X^2$ are located approximately in this X-plane, wherein these measuring coils naturally are expanded somewhat in the Y-direction, depending on thickness and design. The windings 21 of measuring coils $+X^1$ and $+X^2$ of the measuring coil pair +X on one side of the cable 3 and also the corresponding windings 21 of measuring coils $-X^1$ and $-X^2$ of the other measuring coil pair −X on the other side of cable 3 are respectively connected in series. The measuring coil combination $+X^1$, $-X^1$ measures the intensity of field lines 20' in front of the measuring plane M while the measuring coil combination $+X^2$, $X^2$ determines the intensity of the field lines 20" behind the measuring plane M. In other words, the effective distance of the enclosed field from the conductor axis 19 to the coil center is determined.

For the measuring coil pair +X, the voltage is determined as the sum of the partial voltages induced in the individual coils $+X^1$ and $+X^2$. The same is true for the measuring coil pair −X. The difference between these two voltages is then determined. For example, if the conductor axis 19 coincides precisely with the central axis Z, which forms the axis of symmetry for the measuring coil combinations $+X^1$, $-X^1$ or $+X^2$ and $-X^2$, the measuring coils $+X^1$ and $-X^1$ measure the field intensity in front of the measuring plane M while the measuring coils $+X^2$ and $-X^2$ determine the field intensity behind the measuring plane M. Since the measuring coil pairs +X and −X are arranged symmetrical to the measuring plane M and the above-described difference is determined, the measuring plane M must be viewed as active measuring plane for the inductive measuring coil arrangement, which also represents the measuring plane for the optical measuring device.

It is important for the device according to the invention that the central measuring point S is positioned in the measuring plane M and the measuring plane for the optical measuring device therefore coincides with the active measuring plane for the inductive coil arrangement. The device according to the invention must be adjusted for this, which is done by aligning a bare conductor without insulating jacket precisely along the central axis Z. If the measuring coils for the measuring coil pairs are in the desired location, wherein the form and surface of the individual measuring coils are identical, the differential voltage should be equal to zero. If the measuring voltage is not equal to zero, for example, this can be caused by the fact that the two measuring coils of a pair of measuring coils +X, −X, +Y, −Y that are located in front of and behind the measuring plane M are not positioned symmetrical to the measuring plane M. In that case, it is necessary to change the position of the inductive measuring coil arrangement relative to the position of the optical measuring device until the differential voltage is equal to zero.

To determine whether the central measuring point S is located precisely in the measuring plane M, the bare conductor is tilted during the adjustment with respect to the central axis Z, so that the central axis Z and the conductor axis 19 intersect in the measuring plane for the optical measuring device. If the central measuring point S for this constellation is located in the measuring plane of the optical measuring device, then the differential voltage in this case is also equal to zero. Additional details concerning this are described below in connection with the explanation for FIG. 5. However, if the differential voltage is not equal to zero, then the optical measuring device must be displaced relative to the inductive measuring coil arrangement (or vice versa), until the differential voltage is equal to zero.

Figure 5:
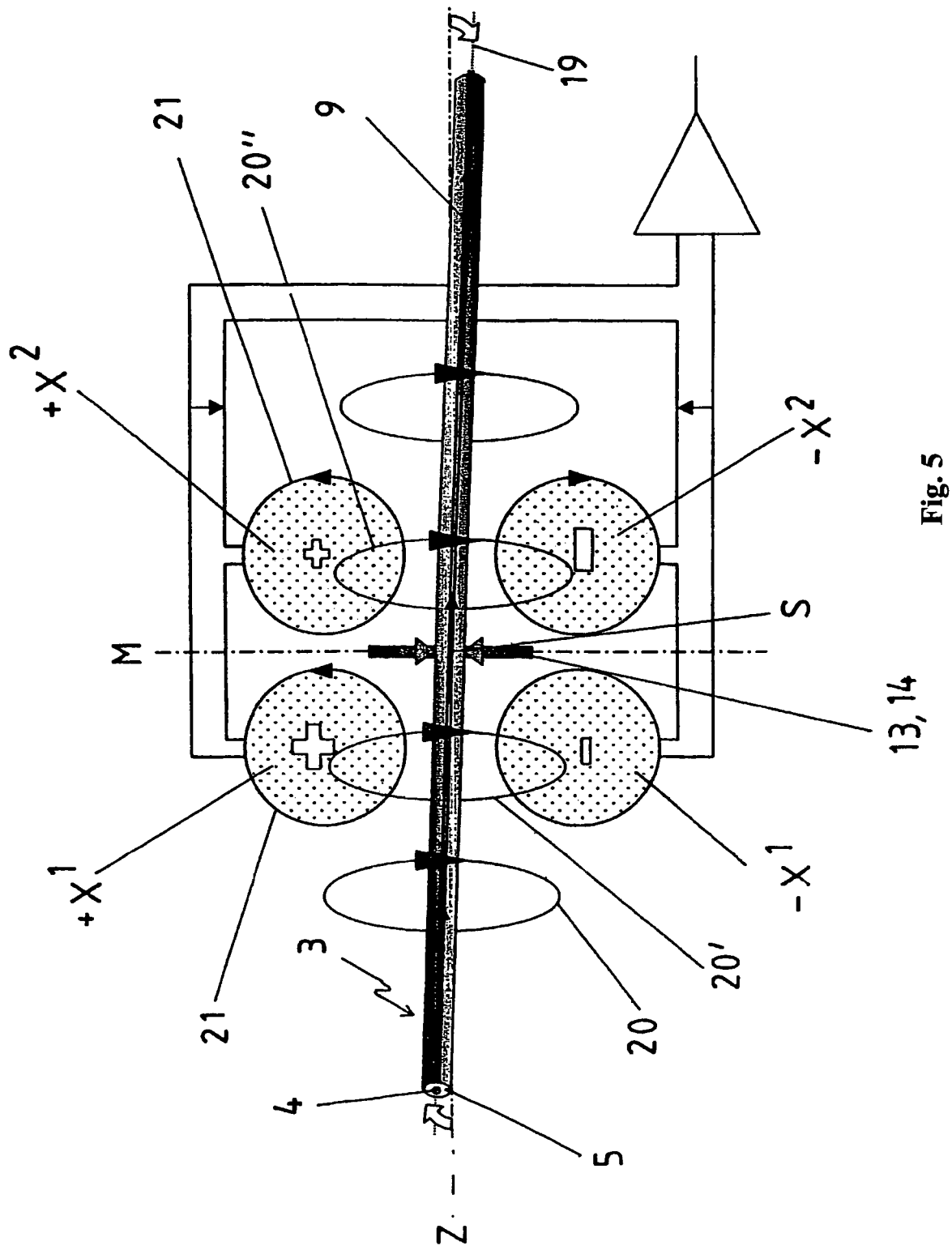
FIG. 5 A view that is analogous to FIG. 4, but with the conductor axis being tilted relative to the central axis.

The only difference between the views shown in FIGS. 4 and 5 is that in FIG. 5 the cable 3 is tilted relative to the central axis Z, but in such a way that the conductor 4 of this cable 3 extends through the central measuring point S in the measuring plane M. The differential voltage in this case is again equal to zero, provided the conductor 19 is arranged centrally inside the cable 3 or its jacket 5. The reason for this is that owing to the arrangement selected, the field intensities are determined in the active measuring plane M and not, for example, in front of the measuring plane M by means of the measuring coil combination $+X^1$, $-X^1$ or behind the measuring plane M by means of the measuring coil combination $+X^2$ and $-X^2$. Thus, it is not necessary to guide the conductor to be measured in such a way through the measuring device according to the invention that the conductor axis 19 coincides precisely with the central axis Z. The device according to the invention is therefore considerable more error-tolerant since the optical as well as the inductive measurement relate to the active measuring plane M and the cable 3 is located in the same plane for both measurements.

Figure 9:
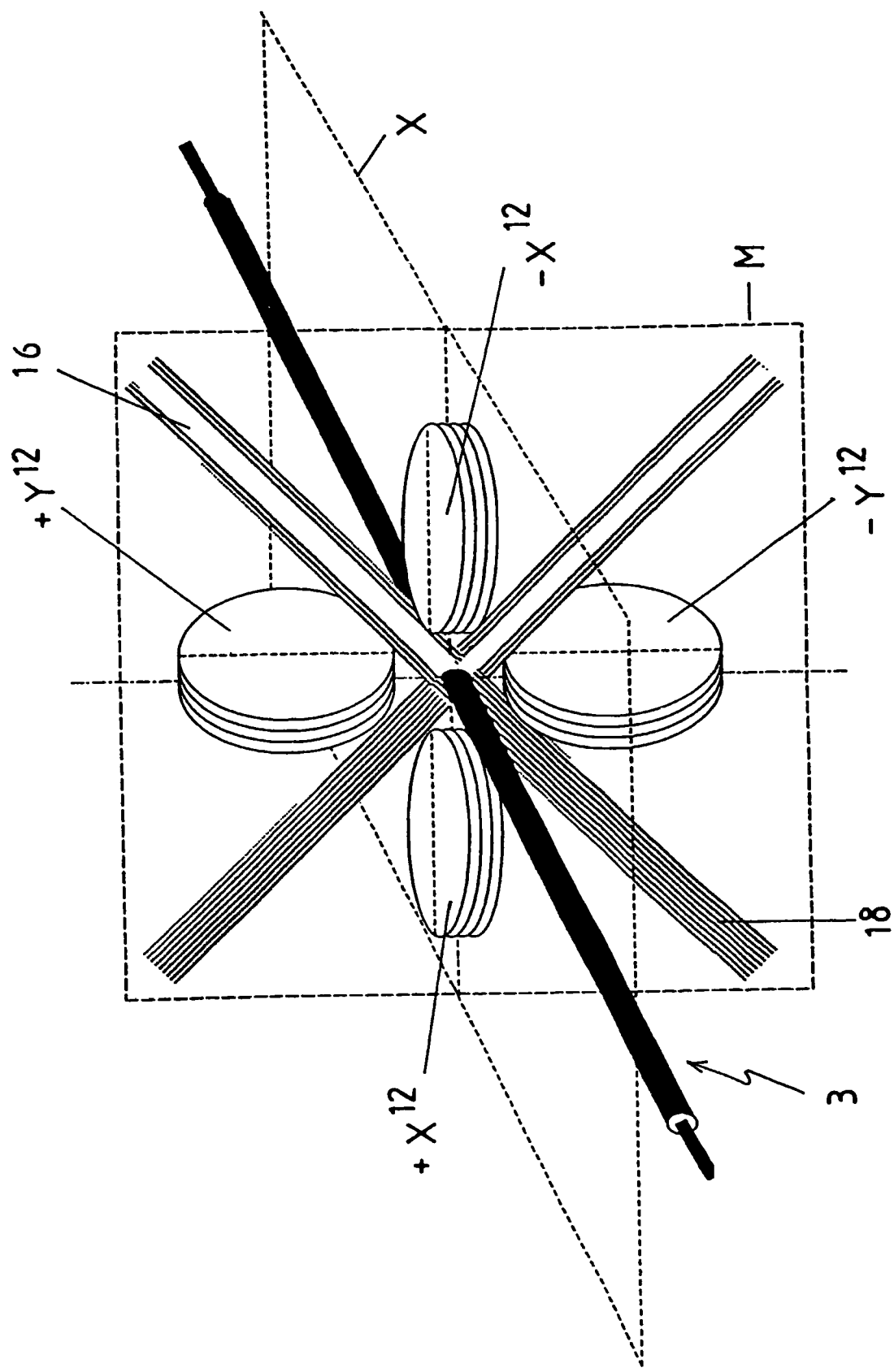

The same advantages can be achieved with an embodiment of the device according to the invention, shown in FIG. 9, in which the measuring coils $+X^{12}$, $-X^{12}$, $+Y^{12}$, $-Y^{12}$ are arranged such that the measuring plane M divides these coils in half. With an embodiment of this type, it is difficult for spatial reasons to carry out the optical measurement in the same X-plane or Y-plane. However, such a measurement can be realized if the X-plane and the Y-plane for the inductive measurement are turned, relative to the X-direction and the Y-direction, e.g. by an angle of 45° as shown in FIG. 9.

If the optical measurement in the X-direction and the Y-direction is to be realized in the X-plane and the Y-plane for the inductive measurement, the embodiments according to FIGS. 3 and 4 are preferred. It is also possible to say that with the embodiment according to FIG. 9, the measuring coils $+Y^{12}$, $-Y^{12}$, $+X^{12}$ and $-X^{12}$ were respectively divided symmetrical to the measuring plane M into a measuring coil pair consisting of separate measuring coils $+Y^1$, $+Y^2/-Y^1$, $-Y^2/+X^1$, $+X^2/-X^1$, $-X^2$, in accordance with the embodiments shown in FIGS. 3 and 4.

It is furthermore not absolutely necessary, even though preferred, if the X-plane and the Y-plane for the inductive measuring coil arrangement and the X-direction and the Y-direction of the optical measuring device are perpendicular to each other. In principle, these angles can have an optional value.

It is furthermore also possible to realize the optical measurement in more than two directions, for example in three or four directions, wherein these measurements naturally are all realized in the measuring plane M. The external cable diameter thus can be optically measured in three directions, wherein these directions preferably form an angle of 60° and/or 45° with each other.

The same is true for the inductive measurement. For example, it is possible to replace the four measuring coil pairs, shown in FIGS. 4 and 5, with six measuring coil pairs having the same design, wherein the individual measuring coils are arranged in planes that preferably form an angle of 60° with each other. In that case, all three planes naturally intersect in the central axis Z and are positioned perpendicular to the measuring plane M.

Following the initially described adjustment of the device according to the invention, it can be used to measure extruded cables. As soon as the conductor axis 19 of the cable 3 to be measured no longer extends through the central measuring point S, the differential voltage no longer equals zero. That is the case, for example, if the cable 3 as such is guided through the central measuring point S (which can be determined with the aid of the optical measuring device), but the conductor 4 inside the cable 3 is no longer centrally positioned.

The centricity of the conductor 4 inside the jacket 5 can be determined, even if the cable 3 as such is not guided precisely through the central measuring point S because the latter circumstance can be determined with the optical measuring device. In that case, the inductive measuring coil arrangement would have to indicate a specific differential voltage. If the measured differential voltage differs from the desired differential voltage, it can be mathematically compensated and the eccentricity or centricity of the conductor 4 inside the cable jacket 5 can be determined. However, for the highest possible measuring accuracy, it is preferable if either the position of the optical measuring device or that of the inductive measuring coil arrangement can be changed and adjusted, such that the cable 3 again extends through the central measuring point S, wherein such options for changing and adjusting are disclosed in prior art.

All embodiments shown in the different Figures are embodiments where the inductive measurement is based on an active measurement. The current 9 generates a field, having field lines 20, 20', 20" which concentrically surround the conductor 4. The plane spanned by the windings 21 of the coils in this case extends perpendicular to these field lines. In other words, the spanned plane is located approximately in the X-plane or the Y-plane. For a passive measurement, it is necessary to change the plane for the measuring coils in such a way that it extends approximately tangential to the cable.

Figure 6:
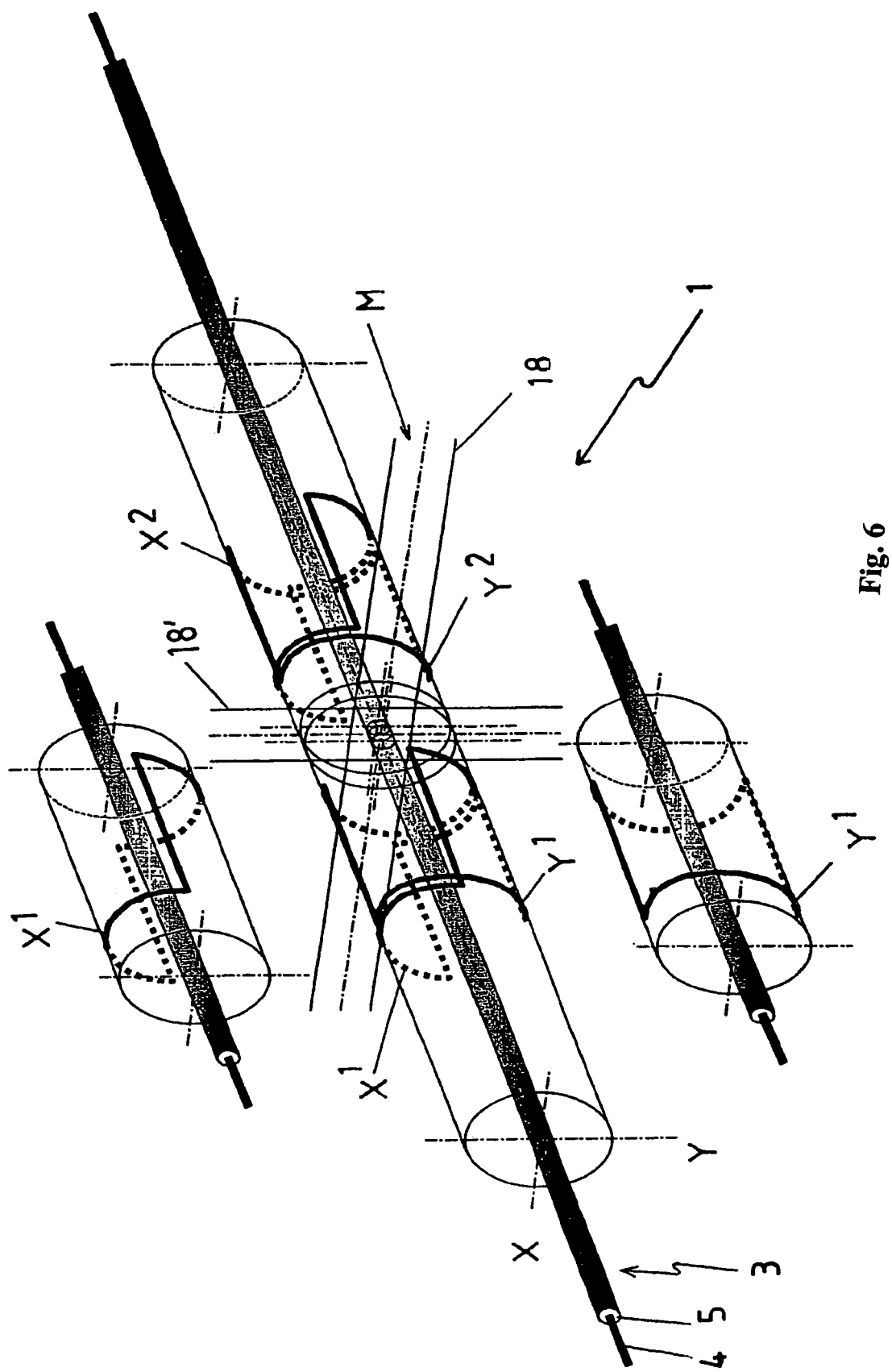
FIG. 6 A basic representation of a measuring coil arrangement in a perspective view, according to a second embodiment for which the measuring coils are differential coils.
Figure 7:
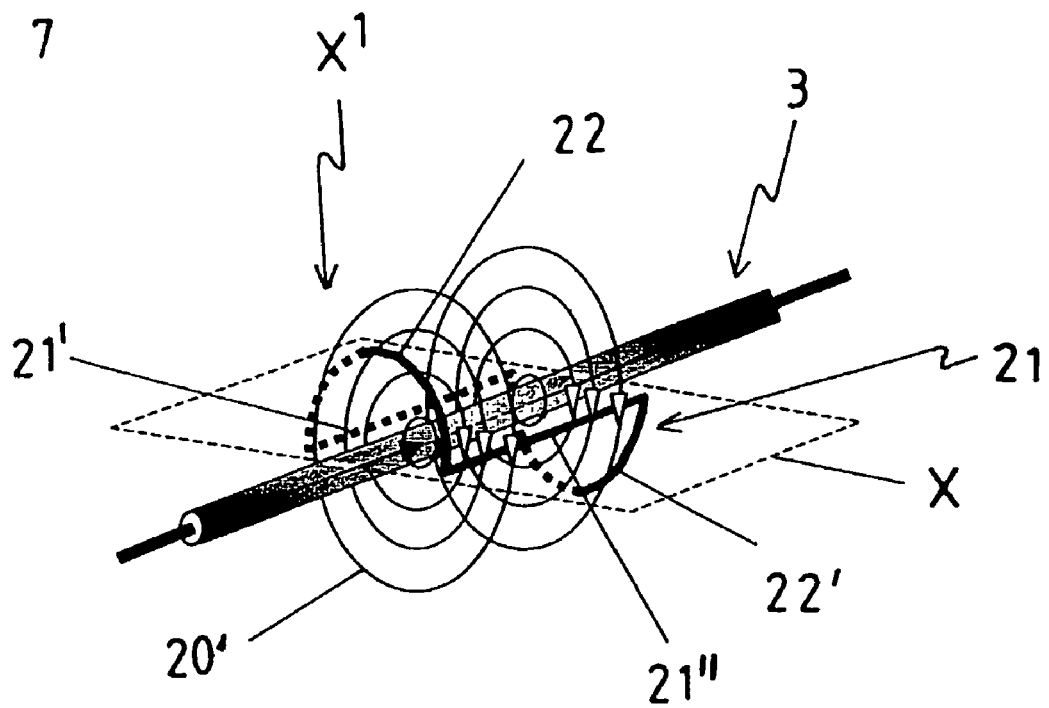
FIG. 7 A basic representation in a perspective view of a single measuring coil according to FIG. 6, shown in the X-plane.

FIGS. 6 and 7 show a different embodiment of the device according to the invention and represent basic perspective views. The optical measuring system corresponds to that of the other embodiments and is only indicated in these Figures. The actual difference lies in the type of measuring coil used, which are so-called differential coils.

Measuring coil pairs X, Y are used even for this embodiment and are arranged on both sides of the measuring plane M. In the center of FIG. 6, a total of four differential coils $X^1$, $Y^1$, $X^2$, $Y^2$ are jointly shown while a single differential coil $X^1$ is shown above and a single differential coil $Y^1$ is shown below these.

Further details of the differential coil $X^1$ can be found in FIG. 7. The differential coil $X^1$ shown therein has winding sections 21', 21" that extend on both sides of the conductor 4 and the cable 3, as well as parallel thereto in the X-plane. At the axial end of a parallel winding section 21', a connecting bend 22 extends concentric to the conductor 4 and the field lines 20 to the other end of the adjacent, parallel winding section 21." This connecting bend is action-neutral. The winding 21 continues parallel to the cable 3 in the opposite direction, meaning on the opposite side of the conductor, and thus in counter direction to the winding section 21', wherein the parallel section also extends in the X-plane. At the end of this parallel section, the winding 21 again transitions to a connecting bend parallel to the field lines 20 where the next winding of the above-described type can follow. The two connecting bends 22 and 22' form approximately a full circle, but can also be located on one side of the central axis Z since they are action-neutral.

Figure 8:
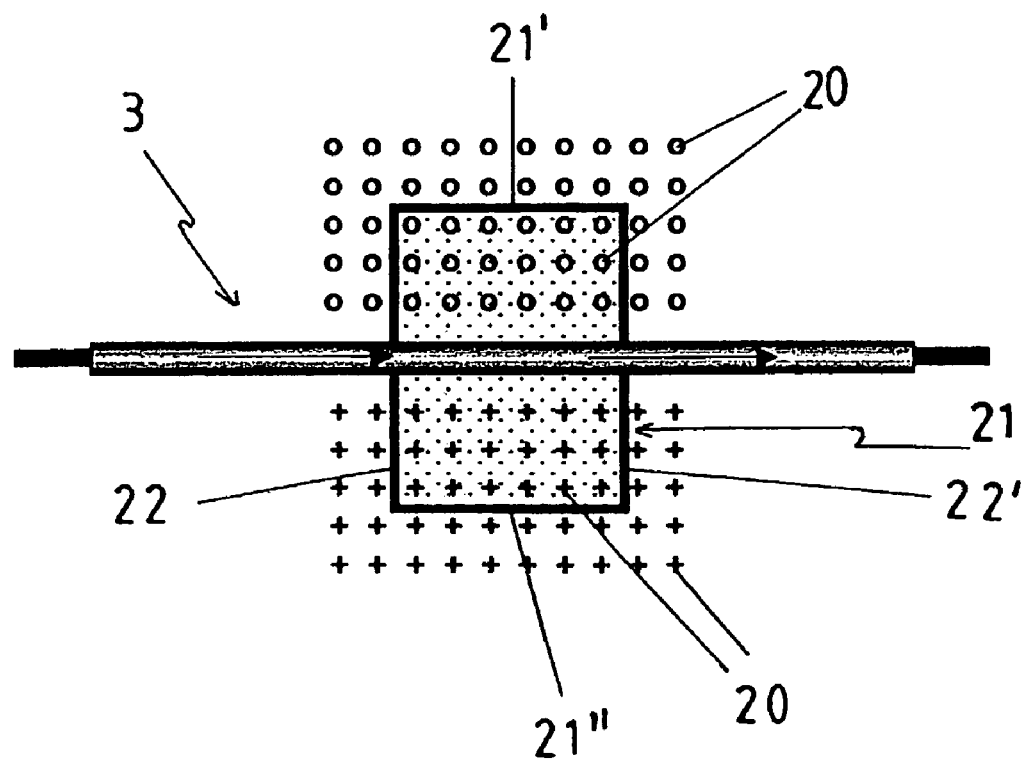
FIG. 8 The course of the field lines in the X-plane according to FIG. 7, for a conductor with current induced therein and FIG. 9 A perspective basic representation of a different embodiment, for which the measuring coils are "cut in half" by the measuring plane M.

A differential coil $X^1$ of this type approximately measures the field in the X-plane, shown in FIG. 8, which is edged with strong black lines. In this Figure, submerging field lines 20 are shown with (+) while the small circles (°) represent appearing field lines 20.

If both coil halves of this differential coil $X^1$ have identical effective surfaces, then opposite voltages are induced corresponding to the direction of the field lines 20 which consequently cancel each other out in the same coil if the conductor axis 19 coincides with the central axis Z that represents an axis of symmetry. If the conductor axis 19 moves away from this axis of symmetry, then the equilibrium is disturbed, resulting in a voltage corresponding to the difference in the induced partial voltages in both coil halves +X and −X result, that is to say in the direction of the corresponding phase relative to the induced current. The mathematical sign therefore must be determined by controlling the phase.

A shown in FIG. 6, the differential coil $X^1$ is arranged on one side of the measuring plane M. The corresponding differential coil $X^2$ is arranged on the opposite side of the measuring plane M. The latter is used to measure the field in the X-plane on the other side of the measuring plane M.

The field in the Y-plane is measured with the differential coils $Y^1$ and $Y^2$, wherein one is arranged in front of the measuring plane M and the other one on the other side of the measuring plane M. With these differential coils $Y^1$ and $Y^2$, the parallel sections of the windings 21 extend in this Y-plane.

The values determined with the various above-described measuring coils are processed with the aid of electronics 23 for the inductive measurement and fed to a central computer unit 25. The values determined during the optical measurement are processed with electronics 24 for the optical measurement and fed to the same central computer 25. A synchronizing device 29 connects the electronics 23 to the electronics 24 and ensures that all inductive and optical measurements occur simultaneously.

The advantages of adjusting the device according to the invention were previously explained in the above, wherein a positioning system 28 is provided to displace the measuring coil arrangement 1 in the X-plane or the Y-plane. With the aid of this positioning system, the measuring coil arrangement can be displaced such that the line of intersection for the X-plane and the Y-plane coincides with the central axis Z and the central measuring point S is located in the measuring plane M.

The positioning system 28 is provided with positioning drives which can displace the device in the X-direction or the Y-direction and is controlled via the controls 26 and 27 that are activated by the computer unit 25.

If the cable is not centered, the controls 26 and 27 can be activated during the course of the measurement and the measuring device can be displaced with the aid of the positioning system, such that the cable extends centrally, if possible, through the central measuring point S.

It is also possible to provide a positioning system of this type for displacing the optical measuring device.

The invention claimed is:

1. A contactless system for measuring centricity and diameter, said system comprising:
   i) an optical measuring device for determining an external diameter and a position of a cable in an optical measuring plane, the optical measuring plane being perpendicular to and transverse to a central axis Z of a measuring device, wherein the cable comprises a conductor with insulating jacket and is pulled in the direction of the central axis Z through the measuring device;
   ii) an inductive measuring coil arrangement for determining the position of the conductor in an inductive measuring plane, the inductive measuring plane being perpendicular to and transverse to the central axis Z of the measuring device; and
   iii) means for computing the centricity of the conductor inside the jacket based on the position of the cable, determined with the optical measuring device, and the position of the conductor, determined with the inductive measuring coil arrangement,
   wherein measuring coils of the inductive measuring coil arrangement are arranged in pairs or cut in half with respect to the optical measuring plane, said measuring coils determining a field intensity in front of the optical measuring plane and a field intensity behind the optical measuring plane, said inductive measuring coil arrangement correlating the field intensities in front of and behind the optical measuring plane to determine a field intensity in an active inductive measuring plane, said active inductive measuring plane coinciding with the optical measuring plane to form a joint, active measuring plane M.

2. The system according to claim 1, wherein a first optical measurement is taken in a direction X, which is perpendicular to the central axis Z, and a second optical measurement is taken in a direction Y, which is perpendicular to the central axis Z, the X- and Y-directions enclosing an angle, in particular a 90° angle.

3. The system according to claim 2, wherein the optical measuring device is provided with a first light source and a second light source, wherein the first light source emits light in the X-direction and the second light source emits light in the Y-direction onto the cable, and the optical measuring device is respectively provided with a first sensor on the opposite side of the cable in the X-direction from said first light source, and a second sensor on the opposite side of the cable in the Y-direction from said second light source, said first sensor and said second sensor being adapted to respectively detect light emitted by the first and second light sources.

4. The system according to claim 1, wherein all of said measuring coils of the inductive measuring coil arrangement have the same form and effective surface.

5. The system according to claim 1, further comprising a device for inducing a high-frequency alternating current in the conductor, effective surfaces of the measuring coils extending in a X-plane or a Y-plane, the X-plane and the Y-plane intersecting and enclosing an angle, especially a 90° angle, the X-plane and the Y-plane being positioned perpendicular to the joint, active measuring plane M, the central axis Z extending along an intersecting line for the X-plane and the Y-plane.

6. The system according to claim 5, wherein the inductive measuring coil arrangement comprises four measuring coil pairs, four separate measuring coils being positioned in the X-plane and four separate measuring coils being arranged in the Y-plane, a first measuring coil of one of the four measuring coil pairs being positioned in front of the joint, active measuring plane M and a second measuring coil of this measuring coil pair being arranged behind the joint, active measuring plane M, the first and second measuring coils being arranged symmetrical to the joint, active measuring plane M and to the central axis Z.

7. The system according to claim 5, wherein the inductive measuring coil arrangement comprises four measuring coils in the form of differential coils and that the differential coils form measuring coil pairs, for which an effective surface of each pair is cut in half with respect to the central axis Z.

8. The system according to claim 7, wherein the differential coils are provided with winding sections extending on both sides of the central axis Z and parallel thereto, which are connected via connecting bends that extend concentric to the central axis Z and that the parallel winding sections extend either in the Y-plane or the X-plane.

9. The system according to claim 5, wherein the inductive measuring coil arrangement has four measuring coils which are cut in half by the joint, active measuring plane M, such that two are located in the X-plane and two are located in the Y-plane.

10. The system according to claim 5, wherein a first optical measurement takes place in a direction X, which is perpendicular to the central axis Z, and a second optical measurement takes place in a direction Y that is also perpendicular to the central axis Z, the X- and Y-directions enclose an angle, in particular a 90° angle, and wherein the X-direction for the first optical measurement is located in the X-plane for the inductive measurement and the Y-direction for the second optical measurement is located in the Y-plane for the inductive measurement.

11. A method for contactless determination of an external diameter of a cable, the cable comprising a conductor with insulating jacket, and a centricity of the conductor inside the jacket, wherein the cable is pulled through a measuring device alone a central axis Z, comprising:
  i) optically determining a position and an external diameter of the cable in an optical measuring plane, the optical measuring plane being perpendicular and transverse to the central axis Z of the measuring device;
  ii) inductively determining a position of the conductor in an inductive measuring plane, the inductive measuring plane being perpendicular and transverse to the central axis Z of the measuring device, and
  iii) computing the centricity of the conductor inside the jacket based on the optically measured position of the cable and the inductively determined position of the conductor,
  wherein field intensities in front of the optical measuring plane and field intensities behind the optical measuring plane are determined and correlated to determine an active inductive measuring plane, said active inductive measuring plane coinciding with the optical measuring plane to form a joint active measuring plane M.

12. The method according to claim 11, wherein the optical measurement and the inductive measurement take place simultaneously and are processed in real time.

13. A contactless system for measuring centricity and diameter of a cable including a conductor within an insulating jacket, the cable being received along a central axis, said system comprising:
  an optical measuring device adapted to determine a position of the cable in a measuring plane, the measuring plane being perpendicular and transverse to the central axis;
  an inductive measuring coil arrangement adapted to determine a position of the conductor in the measuring plane, said inductive measuring coil arrangement having a plurality of measuring coils arranged in pairs or cut in half with respect to the measuring plane, said inductive measuring coil arrangement being adapted to determine the position of the conductor based on a first field intensity in front of the measuring plane and a second field intensity behind the measuring plane; and
  a device adapted to compute a centricity of the conductor within the jacket based on the position of the cable and the position of the conductor.

* * * * *